(12) United States Patent
Kurumizawa et al.

(10) Patent No.: US 8,547,059 B2
(45) Date of Patent: Oct. 1, 2013

(54) LOCK STRUCTURE FOR BATTERY CHARGING CONNECTOR

(75) Inventors: Naoto Kurumizawa, Aichi (JP); Makoto Yamamoto, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 288 days.

(21) Appl. No.: 13/019,607

(22) Filed: Feb. 2, 2011

(65) Prior Publication Data

US 2011/0201223 A1    Aug. 18, 2011

(30) Foreign Application Priority Data

Feb. 12, 2010  (JP) ................. 2010-028957

(51) Int. Cl.
*H01M 10/46* (2006.01)

(52) U.S. Cl.
USPC ........................................ 320/111

(58) Field of Classification Search
USPC ........... 320/104, 107, 108, 111; 439/296, 439/775
See application file for complete search history.

(56) References Cited

U.S. PATENT DOCUMENTS 5,929,599 A * 7/1999 Watanabe et al. ............. 320/108
2012/0186309 A1   7/2012 Ishida et al.

FOREIGN PATENT DOCUMENTS

| JP | 57-134876 | 8/1982 |
|---|---|---|
| JP | 9-161898 | 6/1997 |
| JP | 2011108490 A | 6/2011 |

OTHER PUBLICATIONS

Japanese Office Action dated Jul. 2, 2013, 2 Pages.

* cited by examiner

*Primary Examiner* — Edward Tso
(74) *Attorney, Agent, or Firm* — Patterson Thuente Pedersen, P.A.

(57) ABSTRACT

A battery charging connector lock structure that locks a power feeding connector to a receptacle of a power receiving connector. The connector lock structure includes a restriction member that moves between a lock position, in which the restriction member restricts movement of a hook of the power feeding connector to prohibit removal of the power feeding connector from the receptacle, and an unlock position, in which the restriction member releases the hook to permit removal of the power receiving connector. The restriction member includes an extension. A stopper is coupled to the extension of the restriction member and moves the restriction member to the lock position or the unlock position. A drive source moves the stopper to move the restriction member to the lock position. An urging member is arranged on the extension of the restriction member to move the restriction member to the lock position.

12 Claims, 9 Drawing Sheets

LOCK STRUCTURE FOR BATTERY CHARGING CONNECTOR

CROSS-REFERENCE TO RELATED APPLICATIONS

This application is based upon and claims the benefit of priority from prior Japanese Patent Application No. 2010-28957, filed on Feb. 12, 2010, the entire contents of which are incorporated herein by reference.

BACKGROUND OF THE INVENTION

The present invention relates to a lock structure arranged in a power receiving connector to lock the power receiving connector with a power feeding connector when charging a battery.

Automobile manufacturers are developing electric vehicles to reduce exhaust emissions from vehicles. An electric vehicle uses a battery as a power source. Whenever the state of charge of the battery becomes low, the user of the electric vehicle must charge the battery with a charger that is installed in a household or a charging station. Charging systems that are easy for a user to use have been disclosed (for example, Japanese Laid-Open Patent Publication No. 9-161898). The prior art charging system includes a power feeding connector, which is arranged, for example, in a household, and a vehicle power receiving connector, which is connectable to the power feeding connector. When the user is at his or her home, the user uses a commercial power grid to charge the vehicle battery by connecting the power feeding connector to the vehicle power receiving connector.

Although fast charging technology is being developed, the time required to charge the battery of an electric vehicle is still much longer than that required to refuel a gasoline engine vehicle. For example, when a user charges the battery of an electric vehicle at his or her home without using a quick charger, the user plugs the power feeding connector to a household power receptacle and connects the power feeding connector to the power receiving connector of the electric vehicle to start charging the battery. The electric vehicle is left in this state over a long period of time. Hence, the user would most likely leave the vehicle unattended to when the battery is being charged. As a result, for example, someone may disconnect the power feeding connector from the electric vehicle that is being charged and connect it to the power receiving connector of another electric vehicle to steal electricity. As another possibility, someone may steal the power feeding connector itself.

The power receiving connector includes a receptacle, which receives the power feeding connector. The receptacle is arranged in a side wall of the vehicle in the same manner as a fuel filler of a gasoline vehicle. Further, the power feeding connector of the prior art is relatively large. Thus, the power feeding connector cannot be stored between the side wall (outer surface) of the vehicle and the passenger compartment.

Accordingly, the inventors of the present invention have invented a power receiving connector that prevents unauthorized disconnection of the power receiving connector while also miniaturizing the power receiving connector.

One aspect of the present invention is a battery charging connector lock structure that locks a power feeding connector including a hook to a receptacle of a power receiving connector. The connector lock structure includes a restriction member that moves in a reciprocating manner between a lock position, in which the restriction member locks and restricts movement of the hook of the power feeding connector, when the power feeding connector is inserted into the receptacle, to prohibit removal of the power feeding connector from the receptacle, and an unlock position, in which the restriction member unlocks and releases the hook to permit removal of the power receiving connector. The restriction member includes an extension. A stopper is coupled to the extension of the restriction member and moves the restriction member to the lock position or the unlock position. A drive source moves the stopper to move the restriction member to the lock position. An urging member is arranged on the extension of the restriction member to move the restriction member to the lock position.

Another aspect of the present invention is a combination of a power feeding connector and a power receiving connector. The power feeding connector comprises a power feeding coupler and a hook. The power receiving connector comprises a receptacle that receives the power feeding coupler; an engagement compartment that receives the hook of the power feeding connector; a restriction member including a distal end and a basal end and being movable between an unlock position, in which the distal end is separated from the engagement compartment, and a lock position, in which the distal end is located in the engagement compartment thereby substantially occupying a gap formed between an inner surface of the engagement compartment and the hook; a stopper that is non-rigidly coupled to the basal end of the restriction member and linearly moved by a drive source; and an urging member arranged between the stopper and the restriction member to permit resilient movement of the restriction member relative to the stopper.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

A power feeding connector for a plug-in hybrid vehicle according to one embodiment of the present invention will now be discussed.

Figure 1:
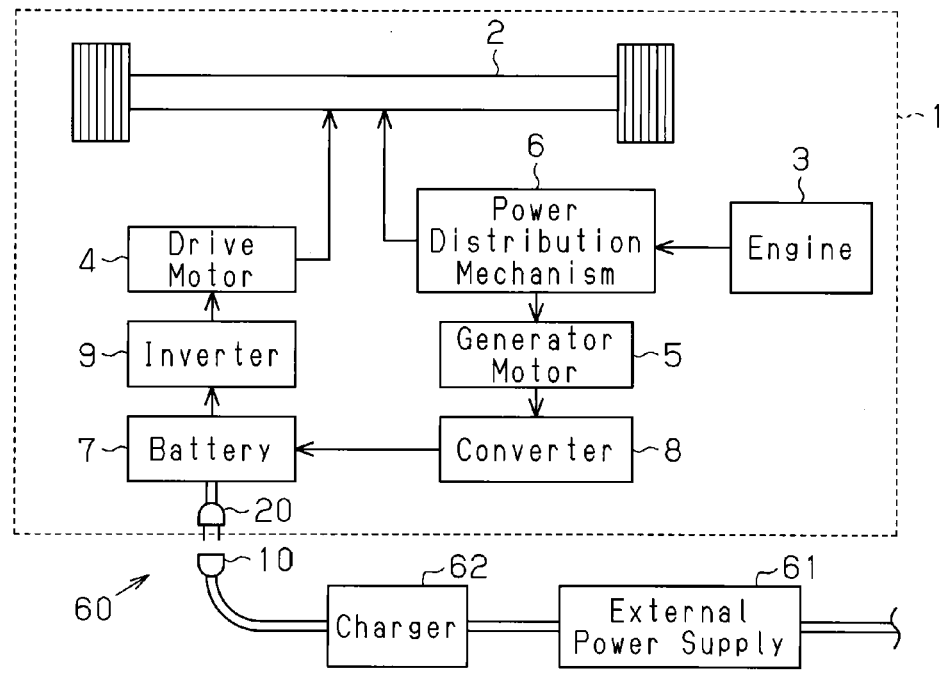
FIG. 1 is a block diagram showing a charging system for a vehicle.

Referring to FIG. 1, a plug-in hybrid vehicle 1 includes an engine 3 and a drive motor 4, each used as drive source for drive wheels 2. The vehicle 1 is switched between a plurality of drive modes when driven. The drive modes include a mode that uses only the engine 3 to drive the drive wheels 2, a mode using the drive motor 4 while generating electric power with the engine 3 to drive the drive wheels 2, a mode using both the engine 3 and the drive motor 4 to drive the drive wheels 2, and a mode using only the drive motor 4 to drive the drive wheels 2.

A power distribution mechanism 6 is arranged between the engine 3 and the drive wheels 2 to distribute the power generated by the engine 3 to the drive wheel 2 and a generator motor 5. The generator motor 5 uses the power of the engine 3 to produce rotation and generate power. The generator motor 5 is connected via a converter 8 to a battery 7. The battery 7 is chargeable with the power generated by the generator motor 5. The drive motor 4 is connected via an inverter 9 to the battery. The drive motor 4 is supplied with and driven by the power stored in the battery 7.

In addition to being charged by the power generated by the generator motor 5, the battery 7 of the plug-in hybrid vehicle 1 is chargeable by an external power supply 61 of the vehicle 1 using, for example, nighttime power supplied from a household power receptacle. The plug-in hybrid vehicle 1 is capable of traveling with just the drive motor 4 over a longer distance than a conventional hybrid vehicle. Further, the hybrid vehicle reduces the frequency in which the engine 3 is operated to perform charging and thereby decreases the dependency on the engine 3.

A vehicle battery charging system 60 is used to charge the battery 7 of the plug-in vehicle 1 shown in FIG. 1. The charging system 60 includes a charger 62, which charges the battery 7 of the vehicle 1. The charger 62 is connected by a power feeding connector 10 to a charge port of the vehicle 1. The charger 62 converts, for example, 200 V of AC commercial power from the external power supply 61 into DC voltage and supplies the DC voltage via the power feeding connector 10 to the vehicle 1.

The plug-in hybrid vehicle 1 includes a power receiving connector 20, which is connected to the power feeding connector 10. The power receiving connector 20 includes a receptacle 20a, which receives the power feeding connector 10. The receptacle 20a of the power receiving connector 20 may be arranged, for example, in a front wall of the vehicle body in the same manner as a fuel filler of a gasoline vehicle. The DC voltage from the power feeding connector 10 charges the battery 7 of the vehicle 1 through the power receiving connector 20. Charging is permitted when two conditions are satisfied, namely, the power feeding connector 10 is received in the receptacle 20a of the power receiving connector 20, and the key carried by the user is authenticated. In a non-limiting example, the key authentication refers to ID code verification of an electronic key.

The structure of the power feeding connector 10 will now be discussed with reference to FIG. 2. The power feeding connector 10 has a main body 11, which includes a basal end 11a, a distal end 11b, and a grip 13. The basal end 11a is connected to a cable 12, which is further connected to the charger 62. The distal end 11b includes a power feeding coupler 14, which is connected to the receptacle 20a of the power receiving connector 20. In the illustrated example, plurality of connection terminals 15 are arranged in the power feeding coupler 14 to electrically connect the power feeding connector 10 to the power receiving connector 20. The connection terminals 15 include a power terminal, through which power is transmitted, control terminals, through which various types of control commands are communicated, and the like.

The power feeding connector 10 includes a hook 16, which is arranged in the vicinity of the power feeding coupler 14 to hold the power feeding connector 10 in the power receiving connector 20. The hook 16 is tiltable between a close position, in which the hook 16 is located near the surface of the power feeding coupler 14 as indicated by the solid line in FIG. 2, and an open position, in which the hook 16 is separated from the surface of the power feeding coupler 14 as indicated by the phantom line in FIG. 2. When the hook 16 is at the close position, the power feeding connector 10 is connected to the power receiving connector 20. When the hook 16 is at the open position, the power feeding connector 10 can be disconnected from the power receiving connector 20. The hook 16 is normally at the close position. The hook 16 moves to the open position when an operation unit 17 such as a release button on the main body 11 is pushed.

Figure 3:
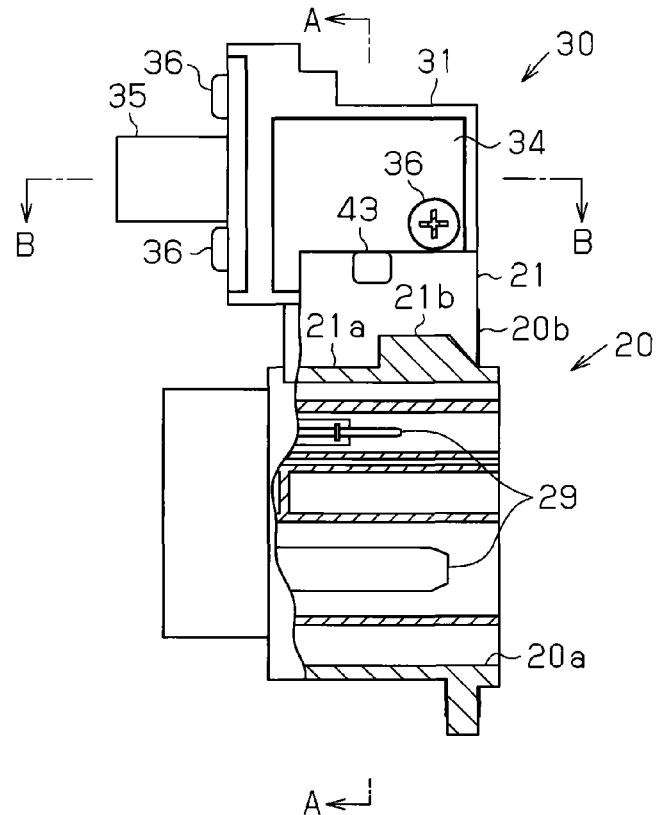
FIG. 3 is a partially cutaway cross-sectional view showing a power feeding connector including a locking device.

The structure of the power receiving connector 20 will now be discussed with reference to FIGS. 3 to 5. In the description hereafter, as shown by the perpendicular coordinate system of FIG. 5, the X axis refers to the frontward direction, the Y axis refers to the sideward direction, and the Z axis refers to the upward direction. The Y axis also conforms to the axial direction of a motor 22 and transmission shaft 25. The receptacle 20a of the power receiving connector 20 includes a plurality of connection terminals 29, which are connected to the connection terminals 15 of the power feeding connector 10. The plurality of connection terminals 29 include a power terminal, which transmits power, and control terminals, which communicate control commands. A catch 21 is formed near the power receiving connector 20 in correspondence with the hook 16. The catch 21 includes an engagement compartment 21a, which has an opening 20b adjacent to the receptacle 20a, and an engagement projection 21b, which is engaged with the hook 16 in the engagement compartment 21a.

As shown in FIGS. 4, 5, and 7 to 9, the power receiving connector 20 includes a locking device 30. The locking device 30 prevents unauthorized disengagement of the hook 16 and catch 21. In the description hereafter, when the hook 16 is in a locked state, the hook 16 remains engaged with the catch 21 at the close position and cannot be moved to the open position. When the hook 16 is in an unlock state, the hook 16 can be disengaged from the catch 21 and be moved to the open position. The locking device 30 switches the hook 16 between the lock state and the unlock state.

The locking device 30 includes the motor 22, which serves as a drive source that drives a lock bar 43. The motor 22 produces drive force that rotates the transmission shaft 25 (geared shaft). The rotational movement of the transmission shaft 25 is converted into linear movement of a stopper 46. The linear movement of the stopper 46 moves the lock bar 43, which serves as a restriction member, to a position above the hook 16 to keep the hook 16 in the locked state.

The locking device 30 includes a main body case 31, which serves as a shell that accommodates inner components such as the lock bar 43 and the motor 22. The main body case 31 includes a main body 32, to which the motor 22 is coupled, and first and second lids 33 and 34, which close openings of the main body 32. In the illustrated example, the first lid 33 closes two open surfaces of the main body case 31, and the second lid 34 closes a single open surface of the main body case 31 that faces toward the longitudinal direction. The main body case 31 includes an external connector 35, which is electrically connected to an external device (not shown).

The main body 32 includes a motor accommodation compartment 32a, which accommodates the motor 22, a component accommodation compartment 32b, which accommodates the lock bar 43 and the like, and a partition wall 32c, which partitions the motor and component accommodation compartments 32a and 32b. The motor 22 has a drive shaft 22a, which is inserted into an insertion bore 32d extending through the partition wall 32c and projected into the component accommodation compartment 32b. The transmission shaft 25 is fixed to and rotated integrally with the drive shaft 22a of the motor 22. The transmission shaft 25 has one end supported by the insertion bore 32d and another end supported by a bearing 34a in the second lid 34. A male threaded portion 25a is formed between the two ends of the transmission shaft 25.

The stopper 46, which is moved by the transmission shaft 25, will now be described. The stopper 46 has a central portion through which a bore extends to receive the transmission shaft 25. The bore includes a female threaded portion 46a, which is mated with the male threaded portion 25a of the transmission shaft 25. The transmission shaft 25 is coupled to the stopper 46 by mating its male threaded portion 25a with the female threaded portion 46a of the stopper 46.

When the motor 22 rotates the transmission shaft 25, the transmission shaft 25 causes linear movement of the stopper 46 in the axial direction. The stopper 46 is resiliently coupled to the lock bar 43. Thus, the linear movement of the stopper 46 moves the lock bar 43 in the axial direction of the motor 22. The stopper 46 is movable in a reciprocating manner between a lock position (restriction position) and an unlock position (non-restriction position). The stopper 46 restricts movement of the hook 16 at the lock position and does not restrict movement of the hook 16 at the unlock position. The transmission shaft 25, which includes the male threaded portion 25a, and the stopper 46, which includes the female threaded portion 46a, is referred to as a rotation-to-linear movement conversion mechanism.

The stopper 46 includes a magnet retainer 46b, which projects orthogonal to the movement direction of the stopper 46. The magnet retainer 46b retains a magnet 47 used to detect the position of the stopper 46. A substrate 37 is secured to an inner surface of the second lid 34. A first hall element 38 and a second hall element 39 are arranged on the substrate 37 at positions facing toward the magnet 47. The first and second hall elements 38 and 39 are respectively arranged in correspondence with the unlock position and lock position of the stopper 46 (lock bar 43).

The stopper 46 includes projections, namely, a lateral rail 46c and a lower rail 46d, which guide the linear reciprocation of the stopper 46. The lateral rail 46c and the magnet retainer 46b are fitted into a pair of lateral guide grooves 32e, which are formed in an inner part of the main body 32. The lower rail 46d is fitted to a lower guide groove 32f, which is formed in an inner lower part of the main body 32.

The stopper 46 is coupled to the lock bar 43, which restricts movement of the hook 16 in the engagement compartment 21a. The lock bar 43 includes a lock portion 43a and a shaft portion 43b, which serves as an extension. The lock portion 43a restricts movement of the hook 16 by substantially occupying a gap formed between the hook 16 and the inner surface of the engagement compartment 21a. The shaft portion 43b is coupled to the stopper 46 and aligned coaxially with the lock portion 43a. Further, the shaft portion 43b supports an urging member such as a spring 48. In the illustrated example, the shaft portion 43b of the lock bar 43 has an outer diameter that is smaller than that of the lock portion 43a. A lock bar guide bore 32g extending in the axial direction of the motor 22 is formed in the main body 32. The lock bar 43 is fitted into the lock bar guide bore 32g in a manner allowing for linear movement in the same direction as the stopper 46.

The lock bar 43 is not rigidly coupled to the stopper 46. Rather, the lock bar 43 is resiliently coupled to the stopper 46. More specifically, the stopper 46 includes a bore 46e, which serves as a recess corresponding to the shaft portion 43b of the lock bar 43. The lock bar 43 is loosely supported by the bore 46e so as to be movable relative to the stopper 46.

The spring 48 is arranged on the shaft portion 43b of the lock bar 43. The spring 48 has one end, which is supported by a step formed between the lock portion 43a and shaft portion 43b of the lock bar 43, and another end, which is supported by the lower rail 46d of the stopper 46. In one example, when the stopper 46 is moved toward a locking side, the spring 48 urges the lock bar 43 to the lock position even when the lock bar 43 gets caught and stops moving.

The shaft portion 43b of the lock bar 43 has a distal end to which a clip 43c is attached to prevent separation of the lock bar 43 from the stopper 46. A clip groove 43d is formed in the part of the shaft portion 43b to which the clip 43c is attached so that the clip 43c is not separated from the lock bar 43 in the axial direction.

The spring 48 constantly urges the lock bar 43 so that the lock portion 43a moves away from the stopper 46. Contact of the clip 43c with the stopper 46 keeps the lock bar 43 coupled to the stopper 46. Linear movement of the stopper 46 from the unlock position to the lock position results in the spring 48 pushing the lock bar 43. This moves the lock bar 43 to the lock position in cooperation with the stopper 46. Further, linear movement of the stopper 46 from the lock position to the unlock position results in the stopper 46 contacting the clip 43c and pulling the lock bar 43. This moves the lock bar 43 from the lock position to the unlock position in cooperation with the stopper 46.

The locking device 30 is provided with an idle rotation mechanism 45, which includes the transmission shaft 25. The male threaded portion 25a is formed over a predetermined length of a middle part (drive range) of the transmission shaft 25 in correspondence with a movement range between the lock position and the unlock position. The transmission shaft 25 is mated with the stopper 46 only at the middle part. When the lock bar 43 reaches the lock position or the unlock position but is further rotated by the motor 22, the idle rotation mechanism 45 disconnects the stopper 46 from the transmission shaft 25 so that drive force is not transmitted to the stopper 46. In this state, the motor 22 produces rotation in an idle state. Accordingly, the drive force from the motor 22 to the transmission shaft 25 is transmitted by only the middle of the transmission shaft 25 in which the male threaded portion 25a is formed. Other parts of the transmission shaft 25 do not transmit the drive force. In this manner, as the motor 22 exceeds its drive range when driven, the stopper 46 is disconnected from the motor 22 thereby stopping the transmission of drive force and producing idle rotation with the motor 22. In the illustrated example, the distal end and basal end of the transmission shaft 25 are free from the male threaded portion 25a and have a relatively small diameter.

A recovery spring 49 is fixed to an inner surface of the second lid 34 facing toward the stopper 46. When the idle rotation mechanism 45 functions and moves the stopper 46 beyond the unlock position, the recovery spring 49 urges the stopper 46 in the direction of the lock position to return the stopper 46 to the unlock position. Movement of the stopper 46 beyond the unlock position results in the stopper 46 contacting and compressing the recovery spring 48 thereby generating a resilient force that urges the stopper 46 toward the unlock position. Further, when the idle rotation mechanism 45 functions and moves the stopper 46 beyond the lock position, the spring 48 arranged on the lock bar 43 is compressed thereby generating a resilient force that urges and returns the stopper 46 to the lock position. The recovery spring 49 and spring 48 are examples of recovery members.

A lower part of the main body 32 includes a projection bore 32k. When located at the lock position, the lock bar 43 is exposed from the component accommodation compartment 32b to the exterior through the projection bore 32k. A support wall 32h is defined in a lower surface of the main body 32 by the part that faces toward the lock bar 43 when the lock bar 43 projects out of the projection bore 32k. When someone attempts to forcibly disconnect the power feeding connector 10 from the power receiving connector 20 by moving the hook 16 upward and lifting the lock bar 43, the support wall 32h supports and holds the lock bar 43 from above. This prevents unauthorized disconnection of the power feeding connector 10.

Figure 6:
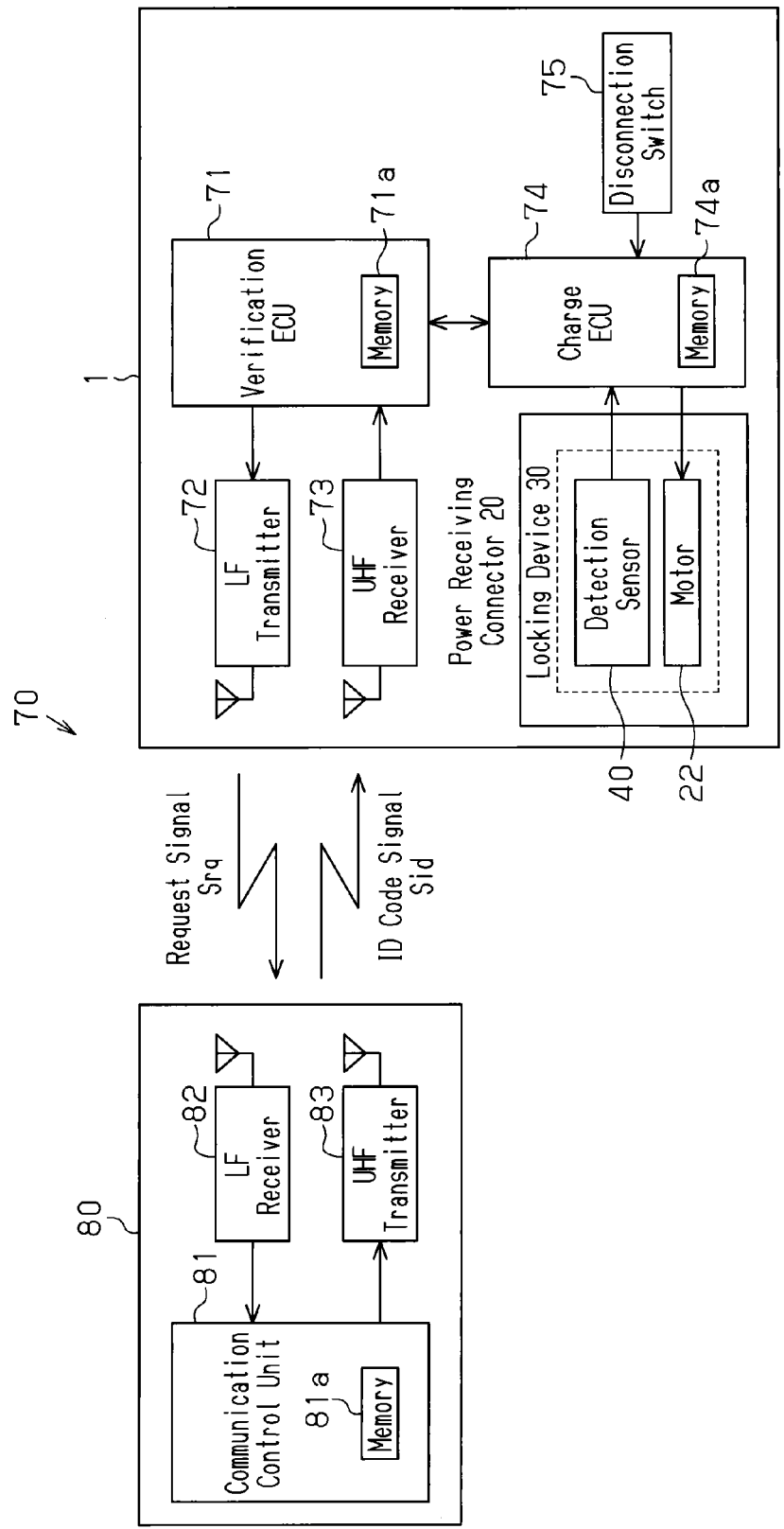
FIG. 6 is a schematic block diagram of an electronic key system and the charging system.

Referring to FIG. 6, an electronic key system 70 is installed in the vehicle 1 so that vehicle operations such as the locking and unlocking of the doors can be performed without the driver actually operating a vehicle key. The electronic key system 70 uses an electronic key 80 as a vehicle key. The electronic key 80 is capable of transmitting a unique ID code through wireless communication. In the electronic key system 70, the vehicle 1 transmits an ID code response request, namely, a request signal Srq, to the electronic key 80. In response, the electronic key 80 sends back an ID code signal Sid, which includes its ID code to the vehicle 1 through narrowband wireless communication. When the ID code of the electronic key 80 conforms to an ID code of the vehicle 1, the locking and unlocking of the doors are permitted or performed.

The electronic key system 70 will now be described. The vehicle 1 includes a verification electronic control unit (ECU) 71, which serves as a verification means for performing ID verification through narrowband wireless communication with the electronic key 80. The verification ECU 71 is connected to a low frequency (LF) transmitter 72 and an ultrahigh frequency (UHF) receiver 73. The LF transmitter 72 is arranged in each door of the vehicle 1 and transmits a signal in the LF band. The UHF receiver 73 is arranged in the vehicle body or the like at the rear of the vehicle 1 to receive wireless signals in the UHF band. The verification ECU 71 includes a memory 71a, which stores an ID code as a unique key code.

The electronic key 80 includes a communication control unit 81, which functions to perform wireless communication with the vehicle 1 in compliance with the electronic key system 70. The communication control unit 81 includes a memory 81a, which stores an ID code as a unique key code. The communication control unit 81 is connected to an LF receiver 82, which receives a signal transmitted from an external device in the LF band, and a UHF transmitter 83, which transmits a signal in the UHF band in accordance with commands from the communication control unit 81.

The verification ECU 71 intermittently transmits a request signal Srq in the LF band from the LF transmitter 72 at a predetermined controlled timing and forms a communication area near the vehicle 1. When the electronic key 80 enters the communication area and receives the request signal Srq with the LF receiver 82, the electronic key 80 sends back an ID code signal Sid including the ID code registered in its memory 81a from the UHF transmitter 83 in response to the request signal Srq. When receiving the ID code signal Sid with the UHF receiver 73, the verification ECU 71 compares the ID code registered in its memory 71a with the ID code of the electronic key 80 to perform ID verification. When ID verification is successful, the verification ECU 71 permits or performs locking and unlocking of the doors with a door lock (not shown).

When the conditions of the electronic key system 70 being successful in ID verification and the power feeding connector 10 being connected to the power feeding connector 10 are both satisfied, the charging system 60 permits charging. The vehicle 1 includes a charge ECU 74, which serves as a control means for executing charging-related control. The charge ECU 74 is communicable with the verification ECU 71 through an in-vehicle local area network (LAN) and is capable of checking the verification ECU 71 for the ID verification result.

The charge ECU 74 is connected to the motor 22 and a detection sensor 40, which serves as a detection means arranged in the locking device 30 of the power receiving connector 20. The detection sensor 40 monitors whether the hook 16 is engaged with the catch 21. When detecting engagement of the hook 16 with the catch 21, the detection sensor 40 sends a detection signal to the charge ECU 74. When the charge ECU 74 confirms that ID verification has succeeded and that the hook 16 is engaged with the catch 21, the charge ECU 74 switches the locking device 30 to the locked state and performs charging.

Under the condition that ID verification has been successful in the electronic key system 70 and that a disconnection switch 75 has been operated in the vehicle 1, the charging system 60 permits the disconnection of the power feeding connector 10 from the power receiving connector 20. In this case, the disconnection switch 75, which is arranged in the vehicle 1 and operated to disconnect the power feeding connector 10, sends an operation signal when operated to the charge ECU 74. When the ECU 74 confirms that ID verification has been successful and that the disconnection switch 75 has been operated, the charge ECU 74 switches the locking device 30 to the unlocked state and permits the disconnection of the power feeding connector 10.

The assembly of the locking device 30 will now be described with reference to FIGS. 4 and 5. The locking device 30 is assembled by coupling components in the longitudinal direction of the main body 32 excluding the first lid 33.

First, the motor 22 is inserted into the motor accommodation compartment 32a in the longitudinal direction of the main body 32. The drive shaft 22a is inserted into the insertion bore 32d of the partition wall 32c so as to project into the component accommodation compartment 32b. Then, the motor 22 is fastened to the motor accommodation compartment 32a.

Subsequently, the magnet 47 is inserted into and retained in the magnet retainer 46b of the stopper 46. The female threaded portion 46a of the stopper 46 is mated with the male threaded portion 25a of the transmission shaft 25. The spring 48 is fitted to the shaft portion 43b of the lock bar 43. Further, the shaft portion 43b of the lock bar 43, onto which the spring 48 is fitted, is inserted into the bore 46e of the stopper 46, which is mated with the transmission shaft 25, and the clip 43c is fitted to the clip groove 43d of the shaft portion 43b. In this state, the urging force of the spring 48 causes the stopper 46 to abut on the clip 43c.

When the transmission shaft 25, the stopper 46, and the lock bar 43 are coupled to one another, they are inserted into the component accommodation compartment in the longitudinal direction of the main body 32. Here, the transmission shaft 25 is fixed to the drive shaft 22a. Further, the lock bar 43 is fitted into the lock bar guide bore 32g of the main body 32, the lateral rail 46c of the stopper 46 is fitted into the lateral guide groove 32e of the main body 32, and the lower rail 46d of the stopper 46 is fitted into the lower guide groove 32f.

Then, one end of the recovery spring 49 is fixed to the inner wall of the second lid 34. The second lid 34 is then coupled to the main body 32 and fastened by a screw 36.

Subsequently, the substrate 37, on which the first and second hall elements 38 and 39 are mounted, is fixed to the first lid 33. The substrate 37 is electrically connected to the motor 22 by two connection terminals 37a. The external connector 35 is also connected to the substrate 37. Then, the first lid 33 is coupled to the main body 32. The locking device 30 is assembled by carrying out these procedures.

The operation for charging the battery 7 with the power feeding connector 10 and the functions of the locking device 30 will now be discussed with reference to FIGS. 7 to 16.

Figure 7:
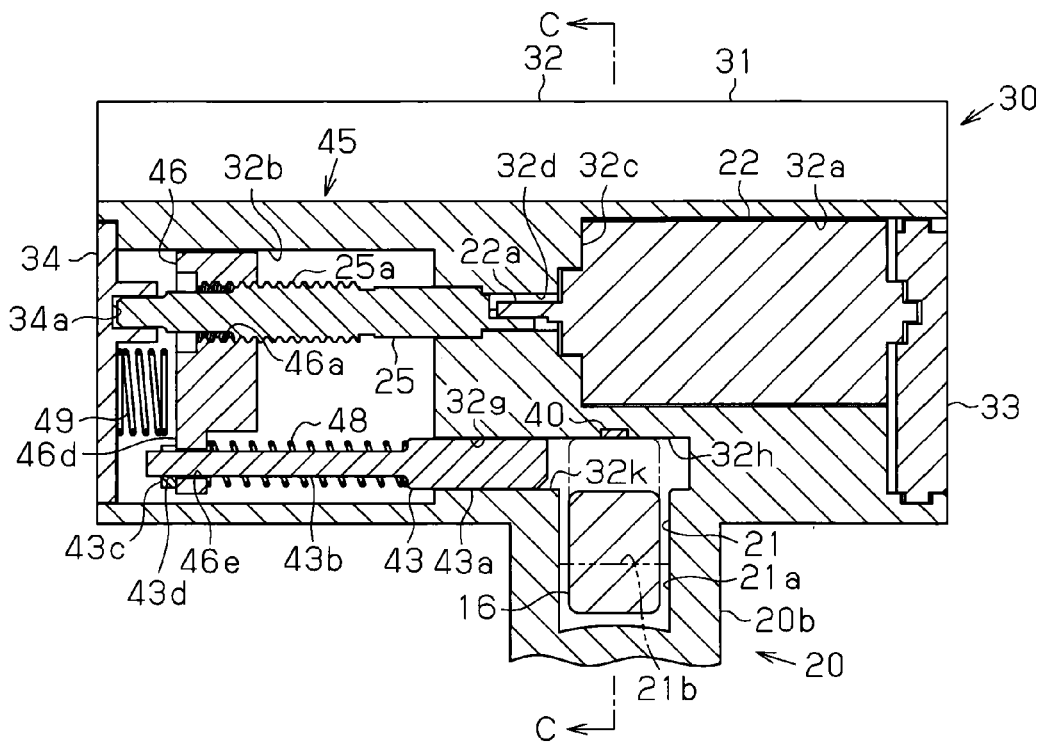
FIG. 7 is a cross-sectional view taken along line A-A in FIG. 3 showing the locking device in which a hook of the power feeding connector is in an unlocked state.
Figure 8:
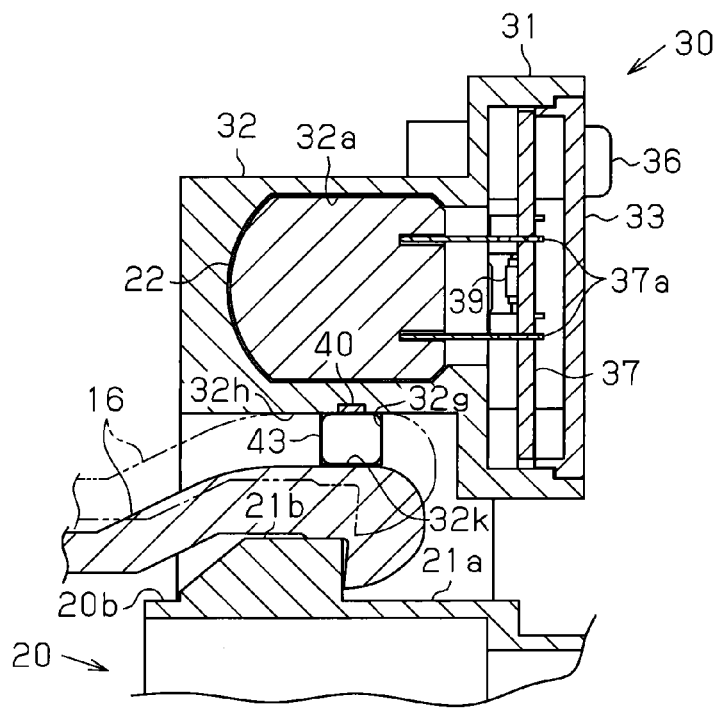
FIG. 8 is a cross-sectional view taken along line C-C in FIG. 7 showing the locking device in which the hook of the power feeding connector is in an unlocked state.
Figure 9:
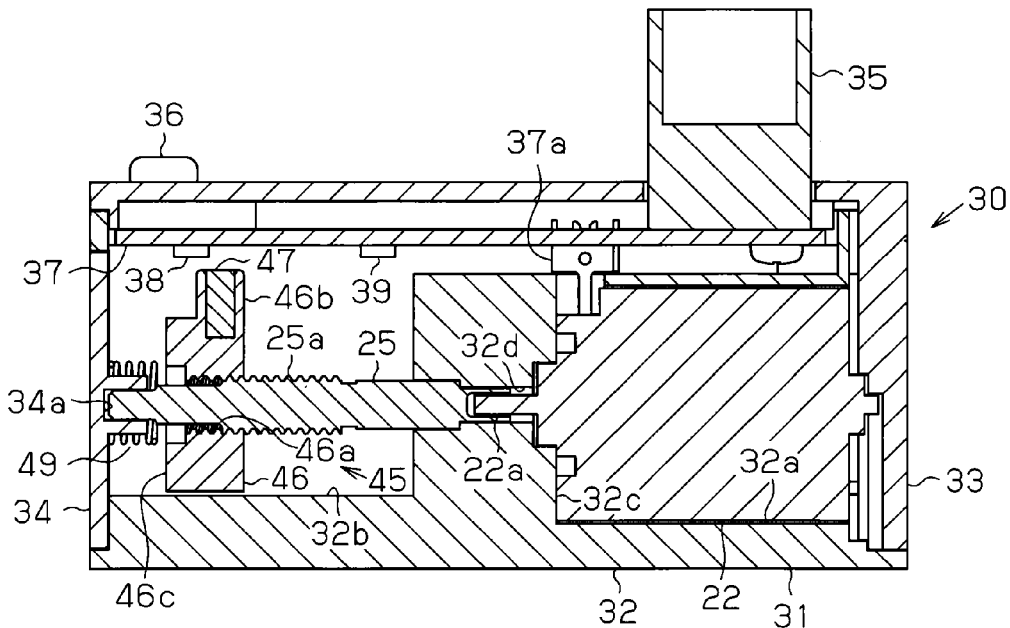
FIG. 9 is a cross-sectional view taken along line B-B in FIG. 3 showing the locking device in which the hook of the power feeding connector is in an unlocked state.

FIGS. 7 to 9 show a state in which the power feeding connector 10 is not connected to the power receiving connector 20. In this state, in the locking device 30, the stopper 46 is located at a position facing toward the first hall element 38, and the lock bar 43 is located at the unlock position.

Figure 2:
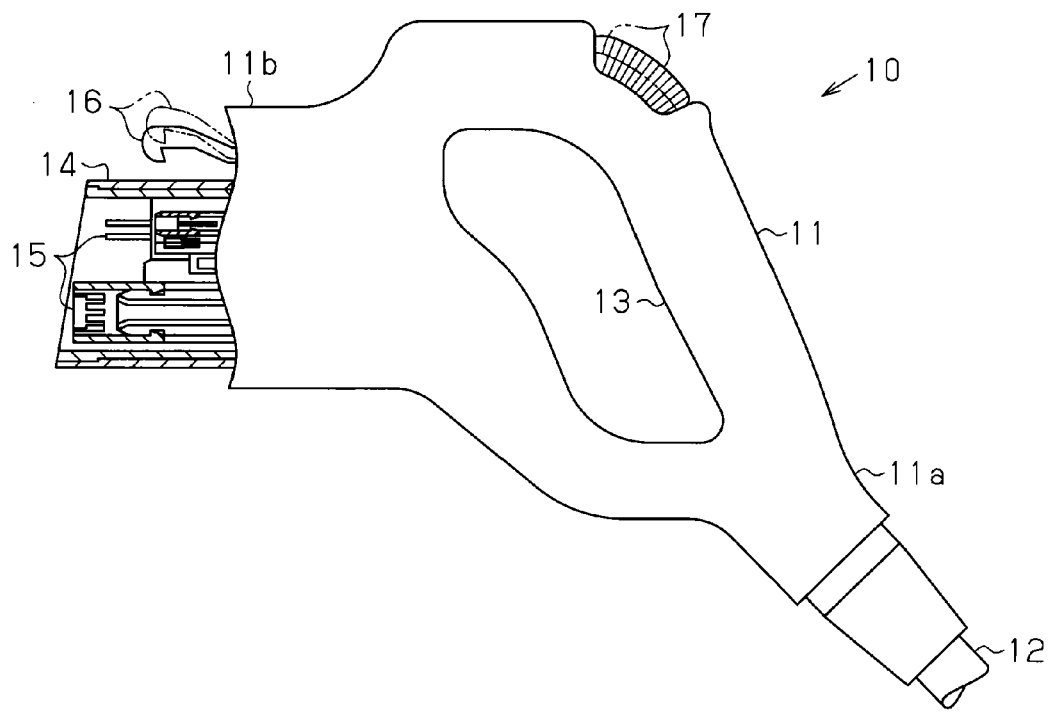
FIG. 2 is a partial cross-sectional view of a power feeding connector.

First, the operation unit 17 is pushed to move the hook 16 away from the power feeding coupler 14 to the unlock position as shown by the phantom line in FIG. 2. Then, the power feeding connector 10 is inserted into the power receiving connector 20 by aligning the hook 16 with the engagement compartment 21a of the catch 21 so that the hook 16 enters the engagement compartment 21a. In this state, the power feeding connector 10 is axially moved into the power receiving connector 20 to connect the connection terminals 15 of the power feeding connector 10 and the connection terminals 29 of the power receiving connector 20. This locates the hook 16 above the engagement projection 21b of the catch 21, as shown by the phantom lines in FIGS. 7 and 8.

The operation unit 17 is released in this state so that the hook 16 moves to the close position and engages the engagement projection 21b, as shown by the solid lines in FIGS. 7 and 8. This connects the power feeding connector 10 to the power receiving connector 20. When the detection sensor 40 detects the engagement of the hook 16 and engagement projection 21b, the detection sensor 40 sends a detection signal to the charge ECU 74. When receiving the detection signal from the detection sensor 40, the charge ECU 74 registers a hook engagement flag in the memory 74a. When confirming that a successful ID verification flag and hook engagement flag are both registered in the memory 74a, the charge ECU 74 sends a drive signal to the motor 22 and starts locking the hook 16.

When the motor 22 is driven, the drive force of the motor 22 rotates the transmission shaft 25. The rotation of the transmission shaft 25 is converted into linear movement of the stopper 46 in the longitudinal direction of the main body case 31. This starts to move the stopper 46 toward the motor 22 in the main body case 31. That is, the stopper 46 starts the linear movement toward the lock position. As the stopper 46 moves toward the lock position while in abutment with the clip 43c, the urging force of the spring 48 linearly moves the lock bar 43 toward its lock position.

Figure 10:
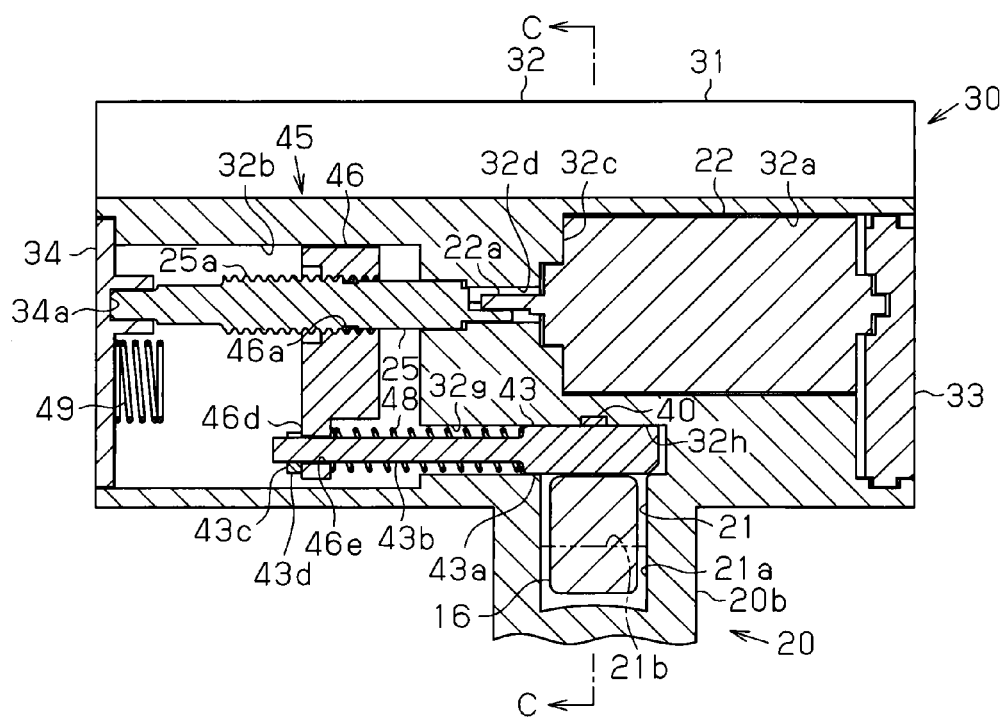
FIG. 10 is a cross-sectional view taken along line A-A in FIG. 3 showing the locking device in which the hook of the power feeding connector is in a locked state.
Figure 11:
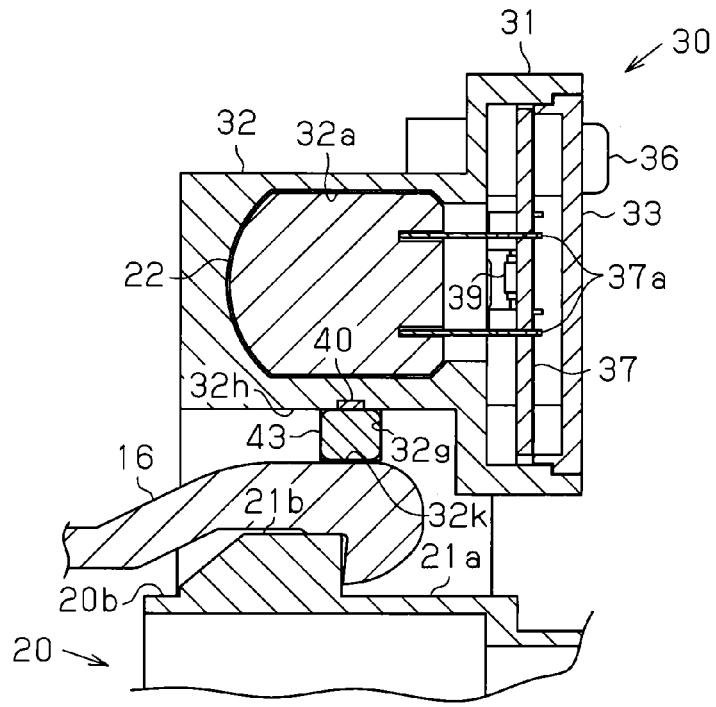
FIG. 11 is a cross-sectional view taken along line C-C in FIG. 10 showing the locking device in which the hook of the power feeding connector is in a locked state.
Figure 12:
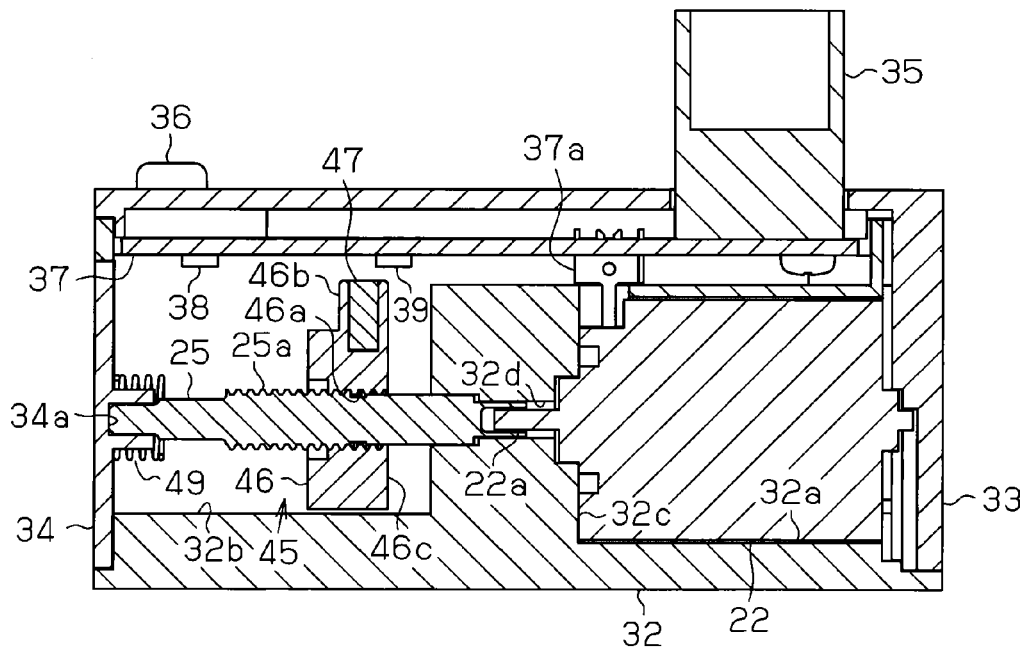
FIG. 12 is a cross-sectional view taken along line B-B in FIG. 3 showing the locking device in which the hook of the power feeding connector is in a locked state.

As shown in FIGS. 10 to 12, when the lock bar 43 is located at the lock position and the magnet 47 of the stopper 46 is located at a position facing toward the second hall element 39, the second hall element 39 detects that the lock bar 43 has reached the lock position. Here, the motor 22 is deactivated, and the lock bar 43 is stopped at the lock position. As a result, the hook 16 is held from above by the lock bar 43 so that it cannot be disengaged from the catch 21. The hook 16 is locked in this state. In this locked state, current flows from the power feeding connector 10 to the power receiving connector 20 to start charging the battery 7.

When the hook 16 is in the locked state, an unauthorized person, for example, may attempt to disconnect the power feeding connector 10 from the power receiving connector 20 by forcibly pulling the power feeding connector 10. In such a case, the forcible pulling would produce a pulling load on the hook 16 that acts to move the hook 16 upward. However, the lock bar 43 is located above the hook 16. The lock bar 43 restricts upward movement of the hook 16 and keeps the hook 16 engaged with the catch 21. Thus, even when someone attempts to forcibly pull out the power feeding connector 10, the power feeding connector 10 remains connected with the power receiving connector 20. This prevents unauthorized disconnection of the power feeding connector 10.

Figure 15:
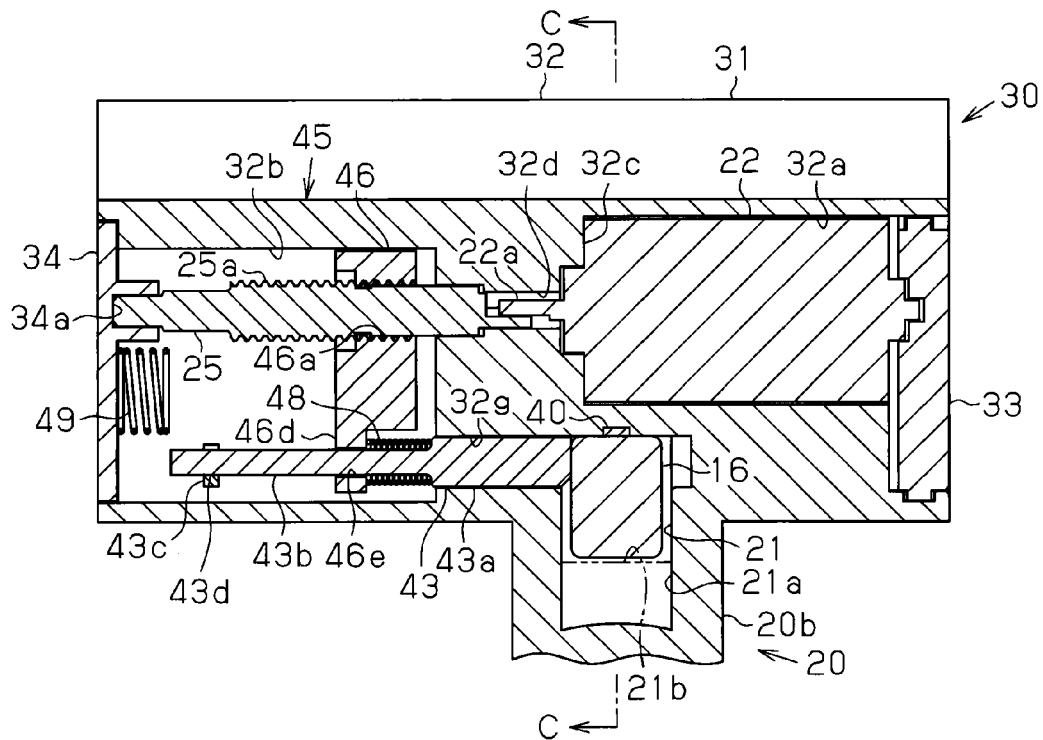
FIG. 15 is a cross-sectional view taken along line A-A in FIG. 3 showing the locking device in which the hook of the power feeding connector is in an incomplete engagement state.
Figure 16:
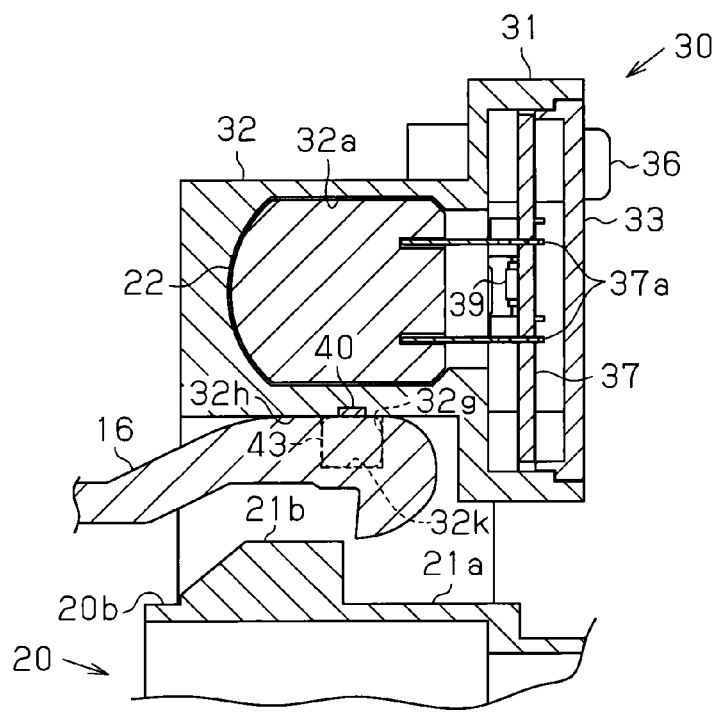
FIG. 16 is a cross-sectional view taken along line C-C in FIG. 15 showing the locking device in which the hook of the power feeding connector is in the incomplete engagement state.

There may be a case in which the hook 16 of the power feeding connector 10 is not completely engaged with the catch 21 of the power receiving connector 20 and gets caught at the peak or the like of the engagement projection 21b for one reason or another as shown in FIGS. 15 and 16. In such a state, the engagement of the hook 16 and the engagement projection 21b would be incomplete. In such an incomplete engagement state, the hook 16 of the power feeding connector 10 would interfere with the linear movement of the lock bar 43 to the lock position. Thus, the lock bar 43 would not be able to move to the lock position.

However, the locking device 30 of the present embodiment includes a structure in which the stopper 46 mechanically separates the motor 22 and lock bar 43. Thus, when in such an incomplete engagement state, the lock bar 43 would remain stopped by an obstacle and not be able to move on even if the motor 22 continues to produce rotation. As a result, for example, when the lock bar 43 cannot be moved due to an obstacle, the lock bar 43 is not forcibly moved by the drive force of the motor 22. Hence, excessive load is not applied to the motor 22, the transmission shaft 25, the stopper 46, and the like. This prevents the motor 22, the transmission shaft 25, the stopper 46, and the like from being damaged.

Further, when the hook 16 is in an incomplete engagement state, the power feeding connector 10 may be slightly moved in upward, downward, leftward, and rightward directions like when aligning the power feeding connector 10 with the power receiving connector 20. This would release the hook 16 so that the hook 16 completely engages the catch 21. Here, the urging force of the spring 48 moves the lock bar 43 to the lock position. Thus, even in an incomplete engagement state, the lock bar 43 may be moved to the lock position. This avoids a situation in which the power feeding connector 10 is left without being attended to in an unlocked state.

When the charging of the battery 7 is completed, the user operates the disconnection switch 75 to disconnect the power feeding connector 10 from the power receiving connector 20. When the disconnection switch 75 is operated, the disconnection switch 75 sends an operation signal to the charge ECU 74. When receiving the operation signal from the disconnection switch 75, the charge ECU 74 registers a disconnection operation flag in the memory 74a. When a successful ID verification flag and a disconnection operation flag are registered, the ECU 74 sends a drive signal to the motor 22 to produce reverse rotation and unlock the hook 16.

As the motor 22 produces reverse rotation, the drive force rotates the transmission shaft 25 in a direction opposite to the direction for moving the stopper 46 toward the lock position. This moves the transmission shaft to the unlock position. As a result, the lower rail 46d of the stopper 46 abuts on the clip 43c and pushes the lock bar 43 toward the unlock position. Thus, as the stopper 46 moves toward the unlock position, the lock bar 43 also moves toward the unlock position.

Then, as shown in FIGS. 7 to 9, when the lock bar 43 is located at the unlock position and the magnet 47 of the stopper 46 is located at a position facing toward the first hall element 38, the first hall element 38 detects that the lock bar 43 has reached the unlock position. Here, the motor 22 is deactivated, and the lock bar 43 is stopped at the unlock position. This releases the hook 16 from the lock bar 43, and the upper part of the hook 16 is no longer held by the lock bar 43. Further, by pushing the operation unit 17, the hook 16 may be opened, or lifted, to disconnect the power feeding connector 10 from the power receiving connector 20.

Figure 13:
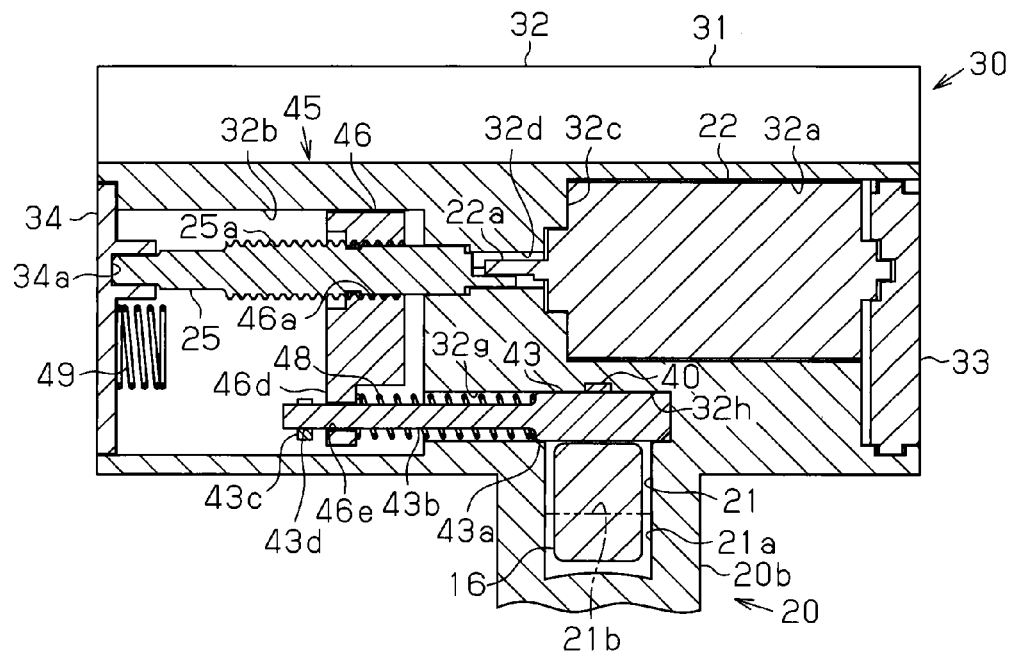
FIG. 13 is a cross-sectional view taken along line A-A in FIG. 3 showing the locking device in which the hook of the power feeding connector is located at a lock position and a stopper is in an idle rotation state.

Referring to FIG. 13, when moving the stopper 46 from the unlock position to the lock position, the motor 22 may continue to produce rotation even though the stopper 46 has reached the lock position. In such a case, when the transmission shaft 25 continues to rotate as the stopper 46 moves beyond the lock position, the idle rotation mechanism 45 functions so that the motor 22 produces idle rotation as the male threaded portion 25a of the transmission shaft 25 separates from the female threaded portion 46a of the stopper 46. Thus, even if the motor 22 produces excessive rotation when performing a locking operation, the lock bar 43 and stopper 46 are released from the rotation. This prevents these components from being damaged.

When the stopper 46 is disconnected from the transmission shaft 25, the spring 48 is in a compressed state. Thus, when the transmission shaft 25 is rotated to return the lock bar 43 from the lock position to the unlock position, the urging force of the spring 48 mates the stopper 46 again with the transmission shaft 25. This returns the stopper 46 to its original state in which it is mated with the transmission shaft 25 and thereby allows the stopper 46 to move to the lock position.

Figure 14:
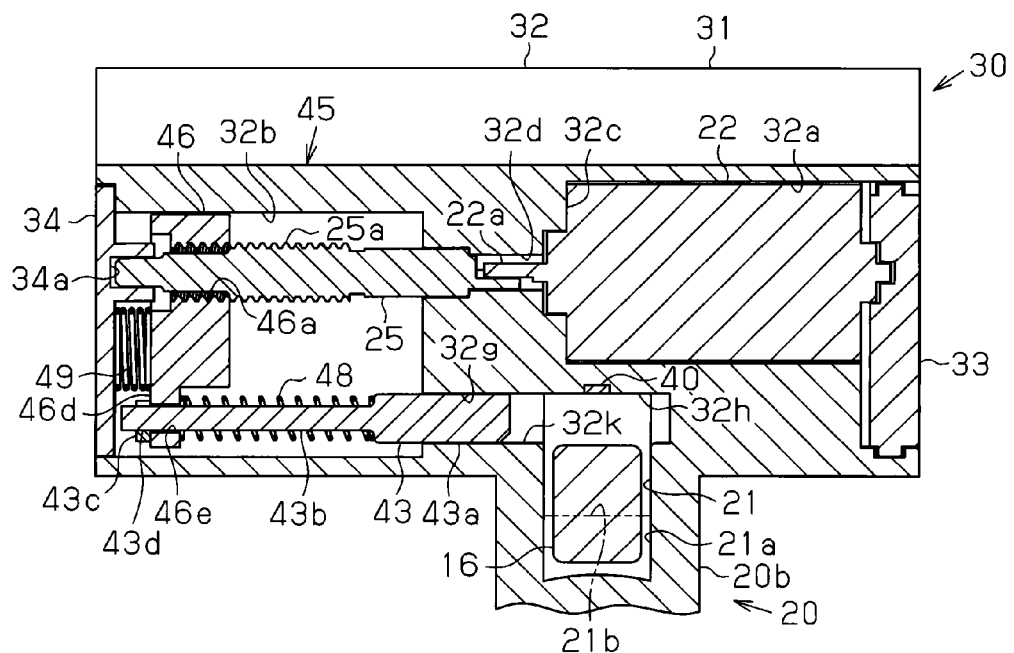
FIG. 14 is a cross-sectional view taken along line A-A in FIG. 3 showing the locking device in which the hook of the power feeding connector is located at an unlock position and the stopper is in an idle rotation state.

Referring to FIG. 14, when moving the stopper 46 from the lock position to the unlock position, the motor 22 may continue to produce rotation even though the stopper 46 has reached the unlock position. In such a case, when the transmission shaft 25 continues to rotate as the stopper 46 moves beyond the lock position, the idle rotation mechanism 45 functions so that the motor 22 produces idle rotation as the male threaded portion 25a of the transmission shaft 25 separates from the female threaded portion 46a of the stopper 46. Thus, even if the motor 22 produces excessive rotation when performing an unlocking operation, the lock bar 43 and stopper 46 are released from the rotation. This prevents these components from being damaged.

When the stopper 46 is disconnected from the transmission shaft 25, the recovery spring 49 is in a compressed state. Thus, when the transmission shaft 25 is rotated to return the lock bar 43 from the unlock position to the lock position, the urging force of the recovery spring 49 mates the stopper 46 again with the transmission shaft 25. This returns the stopper 46 to its original state in which it is mated with the transmission shaft 25 and thereby allows the stopper 46 to move to the unlock position.

In the present embodiment, the power feeding connector 10 is inserted into the power receiving connector 20 to engage the hook 16 with the engagement projection 21b. In this state, the motor 22 is driven to generate drive force that is converted into linear movement. This projects the lock bar 43 out of the projection bore 32k and arranges the lock bar 43 at the lock position. In this state, the operation unit 17 cannot be operated even when pushed and is in a locked state. Thus, an unauthorized party cannot disconnect the power feeding connector 10 from the power receiving connector 20. This prevents theft of the power feeding connector 10 and theft of electricity that would occur when the power feeding connector 10 is connected to another vehicle.

Further, when the hook 16 of the power feeding connector 10 is not completely engaged with the catch 21 and is in an incomplete engagement state, the hook 16 interferes with the linear movement of the lock bar 43 to the lock position. Thus, the lock bar 43 cannot move to the lock position. However, the locking device 30 of the present embodiment has a structure in which the stopper 46 mechanically separates the motor 22 and the lock bar 43. Thus, even if the motor 22 continues to produce rotation, the lock bar 43 remains stopped by the obstacle and does not move on. As a result, the lock bar 43 is not forcibly moved by the drive force of the motor 22, and excessive force is not applied to the motor 22, the transmission shaft 25, the stopper 46, and the like. This prevents the motor 22, the transmission shaft 25, the stopper 46, and the like from being damaged.

When the charging of the battery 7 is completed and the disconnection switch 75 is pushed, the motor 22 starts to produce reverse rotation as long as ID verification is successful. This moves the stopper 46 together with the lock bar 43 away from the motor 22 to the unlock position. Thus, the lock bar 43 is separated from the hook 16, and the lock bar 43 unlocks the hook 16. In this state, the power feeding connector 10 can be disconnected from the power receiving connector 20.

The lock bar 43 is rod-shaped, and the spring 48 is arranged on the shaft portion 43b of the lock bar 43. The lock bar 43 and stopper 46 are coupled to each other by inserting the lock bar 43 into the bore 43e of the stopper 46 and attaching the clip 43c to the portion of the lock bar 43 extending out of the bore 46e. Thus, components for integrating the lock bar 43 and the stopper 46 are arranged in a concentrated manner near the shaft portion 43b of the elongated lock bar 43. In this layout, components are overlapped with one another. This saves spaces and allows for miniaturization of the locking device 30 in a direction perpendicular to the shaft portion 43b of the lock bar 43 (the direction of the X axis as viewed in FIG. 4).

Figure 4:
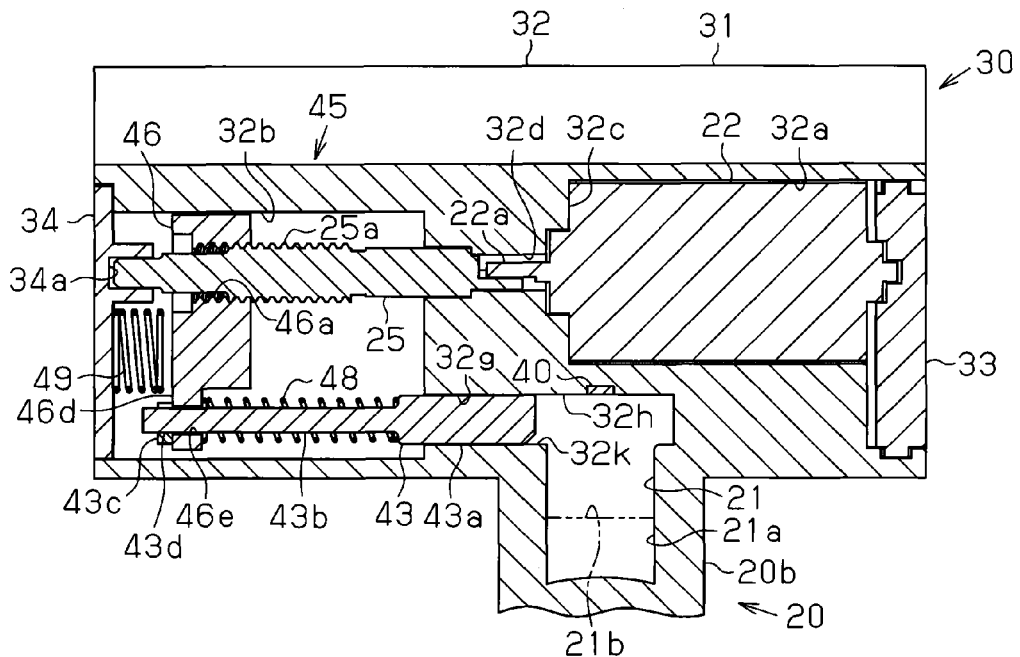
FIG. 4 is a cross-sectional view taken along line A-A in FIG. 3 showing the locking device.
Figure 5:
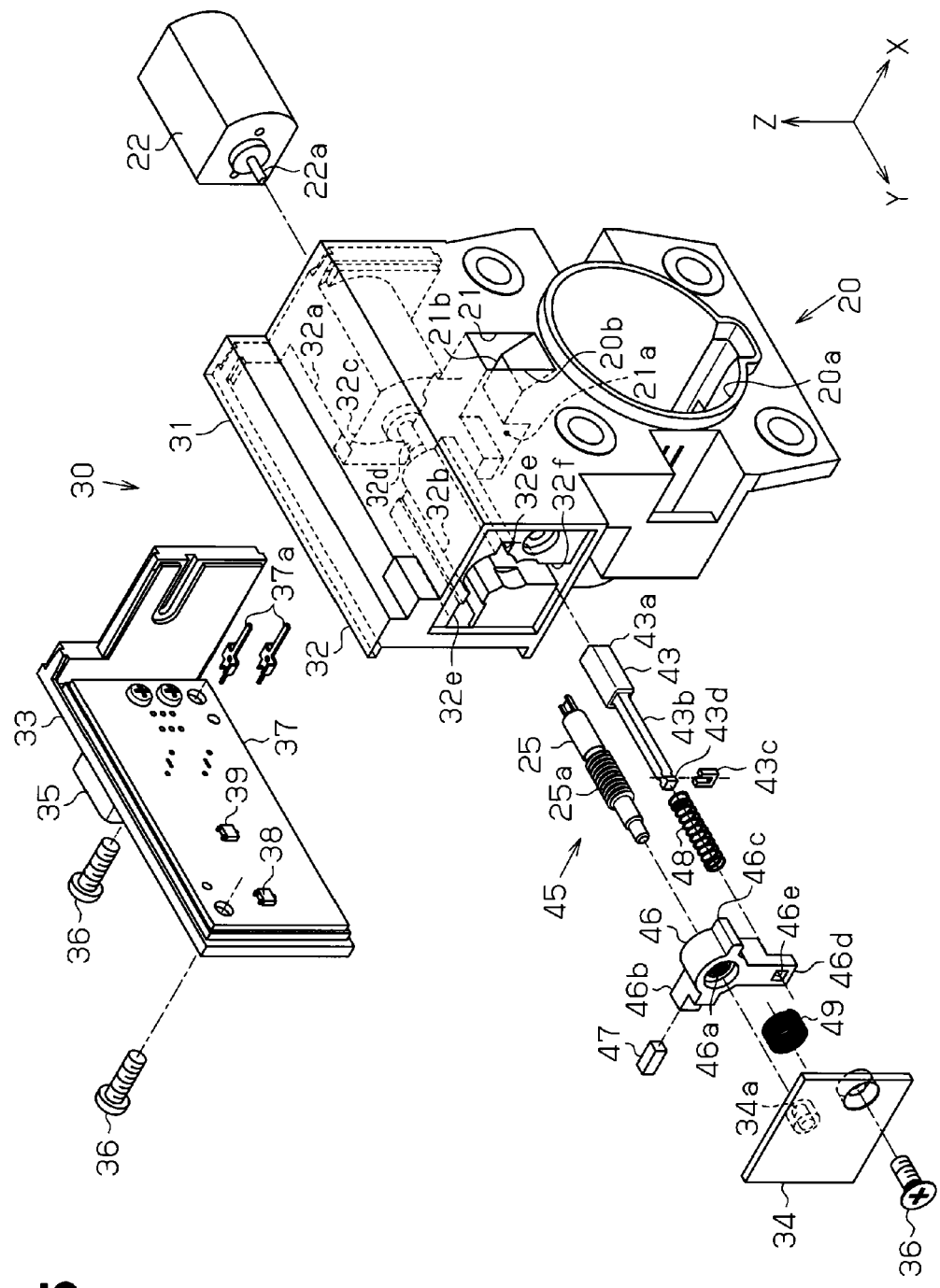
FIG. 5 is an exploded perspective view showing the power feeding connector including the locking device.

When miniaturizing the locking device 30 in the direction of the X axis as viewed in FIG. 4, the diameter of the spring 48 may be decreased. However, a decrease in the diameter of the spring 48 may deform the spring 48 when it is compressed. This may obstruct the lock bar 43 when moving to the lock position. However, in the present embodiment, the spring 48 is fitted onto the shaft portion 43b of the lock bar 43, and the shaft portion 43b functions to maintain the form of the spring 48. Thus, even if the diameter of the spring 48 were to be decreased, the spring 48 would resist deformation. This further ensures that the lock bar 43 is arranged at the lock position or the unlock position. The catch 21 and the locking device 30 are just one example of a connector lock structure.

The embodiment discussed above has the advantages described below.

(1) The locking device 30 of the power receiving connector 20 prevents an unauthorized party from disconnecting the power feeding connector 10 from the power receiving connector 20. When the hook 16 is not completely engaged with the catch 21 and is in an incomplete engagement state, the hook 16 may interfere with the lock bar 43, and the lock bar 43 may not be able to enter the engagement compartment 21a. In this case, the lock bar 43 and the stopper 46 are resiliently coupled to each other by the spring 48. This prevents the lock bar 43 from being damaged when forcibly pushed. When the hook 16 is in an incomplete engagement state, the power feeding connector 10 may be slightly moved in upward, downward, leftward, and rightward directions to release the hook 16 so that the hook 16 completely engages the catch 21 as the urging force of the spring 48 automatically moves the lock bar 43 to the lock position. Thus, even in an incomplete engagement state, the lock bar 43 may be moved to the lock position. This avoids a situation in which the power feeding connector 10 and power receiving connector 20 are left without being attended to in an unlocked state.

Further, the lock bar 43 is coupled to the stopper 46 by arranging the spring 48 on the shaft portion 43b of the lock bar 43, inserting the shaft portion 43b into the bore 46e of the stopper 46, and holding the shaft portion 43b with the clip 43c. The coupled sections of the lock bar 43 and the stopper 46 are commonly shared by the section in which the spring 48 is arranged. This allows for miniaturization of the locking device 30 in contrast to when the lock bar 43 and the spring 48 are arranged at different locations. Further, the shaft portion 43b of the lock bar 43 supports the interior of the spring 48. Thus, the spring 48 resists deformation when compressed. This further ensures that the lock bar 43 is moved to the lock position and the unlock position.

(2) The lock bar 43 includes the lock portion 43a, which abuts on the hook 16, and the shaft portion 43b, which is coaxial with the lock portion 43a and serves as the axis of the spring 48. Thus, the lock portion 43a and the shaft portion 43b are coaxial and elongated, and the lock bar 43 is rod-shaped and has a compact form.

(3) The stopper 46 moves in a state in which the lock bar 43 is inserted into the bore 46e of the stopper 46. This fixes the positional relationship between the lock bar 43 and the stopper 46. Thus, the movement direction of the lock bar 43 and the stopper 46 is fixed. This stably moves the lock bar 43 and the stopper 46.

(4) To move the lock bar 43 to the unlocking position, the motor 22 is driven to produce rotation in the direction opposite to when locking the hook 16. This releases and unlocks the power feeding connector 10 from the power receiving connector 20 and allows for the power feeding connector 10 to be disconnected from the power receiving connector 20.

(5) The locking device 30 includes the rotation-to-linear movement conversion mechanism (25, 25a, 46, 46a) that converts rotational drive force to kinetic force that linearly moves the lock bar 43 between the lock position and the unlock position. This allows for the use of the motor 22 and provides a relatively simple structure that uses the motor 22 as a drive source.

(6) Even when the motor 22 is abnormal and is operated more than necessary, as the motor 22 moves the stopper 46 beyond the lock position or the unlock position, the idle rotation mechanism 45 functions so that the transmission shaft 25 and the stopper 46 become idle. In this state, the transmission of drive force from the motor 22 to the stopper 46 is suspended. This avoids excessive transmission of drive force to the stopper 46, and prevents these components from damages that may be inflicted if the stopper 46 were to be moved excessively.

(7) When the idle rotation mechanism 45 produces an idle state, the spring 48 or the recovery spring 49 urges the stopper 46 in a direction opposite to the driving direction taken when entering the idle state. This mates the transmission shaft 25 with the stopper 46 again and returns the motor 22 from the idle state to a state in which the drive force is transmitted. Thus, even when the idle rotation mechanism 45 suspends the transmission of drive force from the motor 22, the spring 48 or the recovery spring 49 returns the motor 22 to a state in which the drive force is transmitted when the motor 22 is driven in the opposite direction.

(8) When someone attempts to forcibly disconnect the power feeding connector 10 from the power receiving connector 20, the hook 16 of the power feeding connector 10 applies to the lower side of the lock bar 43 excessive load that may lead to damage. However, the lock bar 43 is supported by the support wall 32h, which is arranged at the opposite side of the hook 16. Thus, even if such an excessive load that may lead to damage is applied to the lock bar 43, the support wall 32h absorbs the excessive load and maintains a locked state. Accordingly, even when the lock bar 43 is formed from resin or the like to reduce costs, the capability for maintaining a locked state remains high. This ensures the required locking capability while reducing component costs.

(9) In addition to the engagement of the hook 16 of the power feeding connector 10 with the engagement projection 21b, the electronic key 80 must be verified to move the lock bar 43 to the lock position. This prevents, for example, an unauthorized person from performing charging and increases the level of security.

(10) The lock bar 43 and the motor 22 are sequentially accommodated in and fastened to the main body case 31. Thus, the locking device 30 may be easily assembled.

(11) The movement direction of the lock bar 43 (axis Y as viewed in FIG. 5) intersects the directions of the engagement force between the hook 16 and the engagement projection 21b (axes X and Z). This allows for a pulling load applied to the hook 16 to be released in different directions and further prevents the lock bar 43 from being damaged.

It should be apparent to those skilled in the art that the present invention may be embodied in many other specific forms without departing from the spirit or scope of the invention. Particularly, it should be understood that the present invention may be embodied in the following forms.

In the embodiment discussed above, the motor 22 is used as the drive source. Instead, the drive source may be a mechanical mechanism. For example, the drive source may be a device that linearly moves the lock bar 43 with a link when a user operates an operation member such as a lever.

In the embodiment discussed above, the hook 16 is arranged above the power feeding coupler 14 of the power feeding connector 10. Instead of using just one hook, two hooks may be arranged above and below the power feeding coupler 14.

In the embodiment discussed above, the transmission shaft 25, the stopper 46, and the lock bar 43 are coupled to the main body 32 in the longitudinal direction. However, these components do not have to be coupled in the longitudinal direction as long as they can be easily coupled to the main body 32. In other words, the transmission shaft 25, the stopper 46, and the lock bar 43 may have any form or structure as long as they satisfy the operation conditions of the present example.

In the embodiment discussed above, the lock bar 43 is linearly moved in the axial direction of the motor 22, which produces rotation. Instead, the lock bar 43 may be rotated in the rotation direction of the motor 22, for example.

In the structure discussed above, the support wall 32h may be eliminated.

In the structure discussed above, the recovery member (spring 48 or recovery spring 49), which returns the transmission shaft 25 from an idle rotation state to a drive force transmission state, may be eliminated. In such a case, when the transmission shaft 25 enters an idle rotation state, this would indicate the occurrence of an abnormality. Thus, an inspection may be conducted before returning the transmission shaft 25 to the drive force transmission state.

In the structure discussed above, the idle rotation mechanism 45 may be eliminated.

In the structure discussed above, the bore 46e is a recess. Instead, the stopper 46 may include a notch.

In the structure discussed above, the bore 46e of the stopper 46 may be eliminated. In this case, the lock bar 43 moves integrally with the stopper 46. Thus, it is desirable that the first and second hall elements 38 and 39 be used to detect an abnormality when the lock bar 43 cannot be moved by an obstacle.

In the embodiment discussed above, the lock bar 43 includes the lock portion 43a and the shaft portion 43b that have different diameters. However, the lock portion 43a and the shaft portion 43b may have different diameters as long as the spring 48 can be held.

Further, the extension on which the spring 48 is arranged does not have to be the shaft portion 43b of the lock bar 43. For example, an L-shaped arm may project laterally from the lock portion 43a of the lock bar 43, and the spring 48 may be arranged on the arm.

In the embodiment discussed above, the motor 22 is used as a drive source. However, a different member such as a solenoid may be used as the drive source.

In the embodiment discussed above, the locking device 30 is driven under the condition that the hook 16 is engaged with the engagement projection 21b and ID verification has been successful. Instead, the locking device 30 may be driven under the condition that only the hook 16 is engaged with the engagement projection 21b. In this manner, various conditions may be used to automatically connect the power feeding connector 10 to the power receiving connector 20.

In the embodiment discussed above, the condition for releasing the locking device 30 from the locked state is not necessarily limited to the disconnection switch 75 being operated when ID verification is satisfied. For example, when the battery 7 is fully charged, the power feeding connector 10 may be automatically disconnected.

In the embodiment discussed above, the electronic key 80 is authenticated by performing ID verification. Instead, mechanical verification may be performed with a mechanical key.

In the embodiment discussed above, the electronic key system 70 may be, for example, an immobilizer system that uses a transponder as a transmission origin of an ID code.

In the embodiment discussed above, the radio wave frequency used by the electronic key system 70 is not limited to LF and UHF and other frequencies may be used. Further, the frequency of the radio wave transmitted from the vehicle 1 to the electronic key 80 and the frequency of the radio wave transmitted from the electronic key 80 to the vehicle 1 do not necessarily have to be different and may be the same.

In the embodiment discussed above, a one-push engine start function may be added to the electronic key system 70 to start the engine just by pushing a switch.

In the embodiment discussed above, user authentication is not necessarily limited to key authentication performed with the electronic key 80 and may be another type of authentication, such as biometric authentication.

In the embodiment discussed above, the power receiving connector 20 is arranged in a front right wall of the vehicle 1. However, the power receiving connector 20 is not limited to such location and may be arranged in a rear wall, a front wall, or the like.

In the embodiment discussed above, the power feeding connector 10 charges the battery 7 of the vehicle 1 with the DC voltage converted from the AC voltage of the external power supply 61 by the charger 62. Instead, the power feeding connector 10 may supply the vehicle 1 with the AC voltage from the external power supply 61, and the vehicle 1 may convert the AC voltage into DC voltage to charge the battery.

In the embodiment discussed above, the power receiving connector 20 is applied to the plug-in hybrid vehicle 1 but may also be applied to an electric vehicle.

In the embodiment discussed above, the power receiving connector 20 that includes the locking device 30 is not limited to the vehicle and may also be applied to any apparatus or machine that includes a rechargeable battery.

The present examples and embodiments are to be considered as illustrative and not restrictive, and the invention is not to be limited to the details given herein, but may be modified within the scope and equivalence of the appended claims.

Technical concepts that may be understood from the embodiment discussed above are described below together with their advantages.

(A) The connector lock structure according to any one of claims 1 to 8, wherein the restriction member and the drive source are accommodated in and coupled to a main body case of the power receiving connector in a longitudinal direction of the main body case.

This structure allows for the restriction member and the drive source to be sequentially accommodated in and coupled to the main body case. Thus, the locking device is easily assembled.

(B) The connector lock structure according to any one of claims 1 to 8, wherein the restriction member is linearly movable in a direction intersecting a direction in which the hook engages its engagement partner, and the restriction member locks the hook in a state engaged with the engagement partner when moved to the lock position from the unlock position.

In this structure, the movement direction of the restriction member intersects with the engagement direction of the hook in the engagement direction. This releases a pulling load applied to the hook in a different direction and further prevents the restriction member from being damaged.

What is claimed is:

1. A battery charging connector lock structure that locks a power feeding connector including a hook to a receptacle of a power receiving connector, the connector lock structure comprising:

a restriction member that moves in a reciprocating manner between a lock position, in which the restriction member locks and restricts movement of the hook of the power feeding connector, when the power feeding connector is inserted into the receptacle, to prohibit removal of the power feeding connector from the receptacle, and an unlock position, in which the restriction member unlocks and releases the hook to permit removal of the power receiving connector, wherein the restriction member includes an extension;

a stopper that is coupled to the extension of the restriction member and moves the restriction member to the lock position or the unlock position;

a drive source that moves the stopper to move the restriction member to the lock position; and an urging member arranged on the extension of the restriction member to move the restriction member to the lock position.

2. The connector lock structure according to claim 1, wherein:
the restriction member further includes a lock portion that abuts the hook;
the extension includes a shaft portion coupled to the stopper and coaxial with the lock portion and supporting the urging member.

3. The connector lock structure according to claim 1, wherein:
the stopper includes a recess that receives the restriction member; and
the stopper is moved in a reciprocating manner by the drive source in a state in which the restriction member is inserted into the recess.

4. The connector lock structure according to claim 1, wherein the restriction member is driven by the drive source in a direction opposite to that when locking the hook so that the restriction member moves to the unlock position thereby unlocking the hook.

5. The connector lock structure according to claim 1, further comprising a conversion mechanism that converts rotation produced by the drive source to linear movement of the restriction member.

6. The connector lock structure according to claim 5, wherein the conversion mechanism includes an idle rotation mechanism that causes the drive source to produce idle rotation by disconnecting the stopper from the drive source to suspend transmission of drive force from the drive source to the stopper when the drive source is driven beyond a drive range corresponding to a movement range between the lock position and the unlock position.

7. The connector lock structure according to claim 6, further comprising a recovery member that returns the stopper from a state in which the transmission of drive force is suspended to a state in which drive force is transmitted.

8. The connector lock structure according to claim 1, wherein the urging member is arranged between the stopper and the restriction member, and the urging member allows the restriction member to resiliently move relative to the stopper.

9. The connector lock structure according to claim 1, wherein:
the restriction member further includes a lock portion that abuts the hook; and
the urging member includes two ends that abut the stopper and the lock portion, and the urging member resiliently deforms to allow the lock portion to resiliently move toward the stopper.

10. The connector lock structure according to claim 3, wherein the urging member resiliently moves the shaft portion relative to the stopper in a state in which the shaft portion of the restriction member is inserted into the recess of the stopper.

11. A combination of a power feeding connector and a power receiving connector, wherein:
the power feeding connector comprises:
a power feeding coupler; and
a hook; and
the power receiving connector comprises:
a receptacle that receives the power feeding coupler;
an engagement compartment that receives the hook of the power feeding connector;
a restriction member including a distal end and a basal end and being movable between an unlock position, in which the distal end is separated from the engagement compartment, and a lock position, in which the distal end is located in the engagement compartment thereby substantially occupying a gap formed between an inner surface of the engagement compartment and the hook;
a stopper that is non-rigidly coupled to the basal end of the restriction member and linearly moved by a drive source; and
an urging member arranged between the stopper and the restriction member to permit resilient movement of the restriction member relative to the stopper.

12. The combination according to claim 11, wherein the power receiving connector further includes:
an idle rotation mechanism that causes the drive source to produce idle rotation by disconnecting the stopper from the drive source to suspend transmission of drive force from the drive source to the stopper when the drive source is driven beyond a drive range corresponding to a movement range between the lock position and the unlock position; and
a recovery member that returns the stopper from a state in which the transmission of drive force is suspended to a state in which drive force is transmitted.

* * * * *